United States Patent
Nakai et al.

(10) Patent No.: US 10,046,829 B2
(45) Date of Patent: Aug. 14, 2018

(54) BICYCLE HYDRAULIC OPERATING DEVICE

(71) Applicant: Shimano Inc., Sakai-shi, Osaka (JP)

(72) Inventors: Mototsugu Nakai, Sakai (JP); Shinya Hirotomi, Sakai (JP); Daisuke Noborio, Sakai (JP)

(73) Assignee: Shimano Inc., Sakai-shi, Osaka (JP)

( * ) Notice: Subject to any disclaimer, the term of this patent is extended or adjusted under 35 U.S.C. 154(b) by 15 days.

(21) Appl. No.: 14/641,178

(22) Filed: Mar. 6, 2015

(65) Prior Publication Data

US 2016/0257372 A1 Sep. 8, 2016

(51) Int. Cl.
| | |
|---|---|
| *B62L 1/00* | (2006.01) |
| *B62L 3/02* | (2006.01) |
| *B60T 7/10* | (2006.01) |
| *B60T 11/22* | (2006.01) |

(52) U.S. Cl.
CPC .............. *B62L 3/023* (2013.01); *B60T 7/102* (2013.01); *B60T 11/22* (2013.01)

(58) Field of Classification Search
CPC .......... B60T 7/102; B60T 11/22; B60T 11/24; B62L 3/023
See application file for complete search history.

(56) References Cited

U.S. PATENT DOCUMENTS

| | | | | |
|---|---|---|---|---|
| 4,499,730 A | * | 2/1985 | Kasahara | ................. B60T 11/22 60/585 |
| 6,922,994 B1 | * | 8/2005 | Lavezzi | .................. B60T 11/16 60/588 |
| 7,497,309 B2 | * | 3/2009 | Chen | ........................ B62L 3/023 188/24.22 |
| 8,146,716 B2 | * | 4/2012 | Siew | ........................ B60T 11/22 188/24.22 |
| 8,714,322 B2 | * | 5/2014 | Dunlap | .................... B62L 3/023 188/344 |
| 2004/0045775 A1 | * | 3/2004 | Lavezzi | ................... B60T 11/16 188/24.11 |
| 2009/0152062 A1 | * | 6/2009 | Tsai | ......................... B60T 11/16 188/344 |
| 2011/0240426 A1 | * | 10/2011 | Hirose | ..................... B60T 7/102 188/344 |
| 2013/0228405 A1 | * | 9/2013 | Tsai | .......................... B62L 3/02 188/344 |
| 2015/0266540 A1 | * | 9/2015 | Snead | ..................... B62K 23/06 188/344 |

FOREIGN PATENT DOCUMENTS

DE    10 2006 004 210    * 8/2007    .............. B60T 11/26

OTHER PUBLICATIONS

Machine Translation of DE 10 2006 004 210 (no date).*

* cited by examiner

*Primary Examiner* — Nicholas J Lane
(74) *Attorney, Agent, or Firm* — Alleman Hall Creasman & Tuttle LLP (57) ABSTRACT

A hydraulic operating device is provided. The disc brake caliper may include a brake lever pivotable on a pivot axis, a hydraulic cylinder having a cylinder axis and a reservoir arranged so as to at least partly overlap the hydraulic cylinder as seen from a first direction perpendicular to the pivot axis, the reservoir having a reservoir axis which has a different orientation than the cylinder axis as viewed from the first direction.

17 Claims, 5 Drawing Sheets

BICYCLE HYDRAULIC OPERATING DEVICE

BACKGROUND

Bicycle hydraulic operating devices, e.g. brake operating devices for hydraulic braking systems, typically include a master cylinder, reservoir, and handlebar clamp. In some prior hydraulic operating devices the axes of the reservoir, master cylinder, and handlebar clamp are arranged in a common plane. It may be desirable to bleed the reservoir to remove gas in the hydraulic braking system. However, when the axes of the reservoir, master cylinder, and handlebar clamp are arranged in a common plane is it difficult to bleed the reservoir when the bicycle is in an upright riding position.

SUMMARY

To address the above issue, a hydraulic operating device is provided. According to a first aspect of the invention, the hydraulic operating device may include a brake lever pivotable on a pivot axis, a hydraulic cylinder having a cylinder axis, and a reservoir arranged so as to at least partly overlap the hydraulic cylinder as seen from a first direction perpendicular to the pivot axis, the reservoir having a reservoir axis which has a different orientation than the cylinder axis as viewed from the first direction. One potential advantage of this configuration is that gas in the reservoir can be more easily bled from the device when the reservoir and hydraulic cylinder are oriented in this way.

In the first aspect, the reservoir axis may be inclined relative to the cylinder axis as viewed from the first direction. One potential advantage of this configuration is a further improvement in bleeding operation of the device.

In the first aspect, the reservoir axis may be inclined relative to the cylinder axis at an inclination angle of between about 1-10 degrees. One potential advantage of this degree of reservoir inclination is to enable the reservoir to enable bleeding operation without impacting other performance characteristics of the hydraulic operating device.

In the first aspect, the reservoir may have a first end portion and a second end portion and the reservoir axis may intersect the cylinder axis at the first end portion of the reservoir as viewed from the first direction. One potential advantage of this configuration is that the compactness of the hydraulic operating device can be increased.

In the first aspect, the reservoir may have a first end portion and a second end portion, the first end portion of the reservoir may be positioned away from the brake lever and the second end portion may be positioned closer to the brake lever than the first end portion, the second end portion may be positioned farther away from the cylinder axis than the first end portion. One potential advantage of this configuration is that the compactness of the hydraulic operating device can be increased.

In the first aspect, the first end portion may have a first port that fluidly communicates with the hydraulic cylinder. One potential advantage of this configuration is that hydraulic characteristics of the device can be improved.

In the first aspect, the second end portion may have a second port for bleeding that communicates with atmosphere. One potential advantage of this configuration is that the hydraulic characteristics of the device can be improved by removing gas from the fluid in the device through a bleeding operation.

In the first aspect, the second port may be positioned higher than the first port when the device is mounted to the handlebar of the bicycle. One potential advantage of this configuration is that the second port can be quickly and easily bled when the device is mounted on a bicycle.

In the first aspect, the hydraulic operating device may further include a handlebar mounting structure having a mounting axis, and the cylinder axis may be non-perpendicular to the mounting axis. One potential advantage of such a configuration is that the ergonomics of the hydraulic operating device can be improved.

In the first aspect, the handlebar mounting structure may be a clamp and the mounting axis is formed at a center of the clamp. One potential advantage of such a configuration is reducing the likelihood of movement of the hydraulic operating device relative to a handlebar when the device is mounted on the handlebar.

In the first aspect, the first direction may also be perpendicular to the mounting axis. One potential advantage of such a configuration is that the reservoir may be more easily bled when the hydraulic cylinder and reservoir are oriented in this manner.

In the first aspect, the reservoir may be at least partly arranged between the cylinder axis and the mounting axis as seen from a second direction that is parallel to the pivot axis. One potential advantage of such a configuration is that the compactness of the hydraulic operating device can be increased.

In the first aspect, the mounting axis may be coplanar with the cylinder axis in a first plane. One potential advantage of such a configuration is improved bleeding functionality in the hydraulic operating device.

In the first aspect, the brake lever may pivot on the pivot axis to arc within a second plane that is nonparallel to the first plane. One potential advantage of such a configuration is improved bleeding functionality in the hydraulic operating device while maintaining an ergonomic brake lever position.

In the first aspect, the reservoir may have a first and portion and a second end portion, the first end portion of the reservoir may be positioned away from the brake lever and the second end portion may be positioned closer to the brake lever than the first end portion, the second end portion may be positioned farther away from the cylinder axis than the first end portion and the handlebar mounting structure may be closer to the second end portion than the first end portion. One potential advantage of such a configuration is that the compactness of the hydraulic operating device can be increased.

In the first aspect, the reservoir may have an interior cylindrical cavity. One potential advantage of such a configuration is improved hydraulic operation of the device.

In the first aspect, the hydraulic operating device may further include an opening in the reservoir and a flexible diaphragm disposed in the opening of the reservoir. One potential advantage of this configuration is improved hydraulic operation in the device.

In the first aspect, the reservoir may have a first end portion and a second end portion and the first end portion of the reservoir may be positioned away from the brake lever and the second end portion may be positioned closer to the brake lever than the first end portion, and the second end portion may be positioned farther away from the cylinder axis than the first end portion and the opening may be arranged at the second end portion of the reservoir. One potential advantage of such a configuration is an improvement in hydraulic functionality in the device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The present disclosure is illustrated by way of example and not by way of limitation in the figures of the accompanying drawings, in which the like reference numerals indicate like elements and in which:

FIGS. 2-5 are drawn approximately to scale unless otherwise indicated.

DETAILED DESCRIPTION

A selected embodiment of the present invention will now be described with reference to the accompanying drawings. It will be apparent to those skilled in the art from this disclosure that the following description of an embodiment of the invention is provided for illustration only and not for the purpose of limiting the invention as defined by the appended claims and their equivalents.

Figure 1:
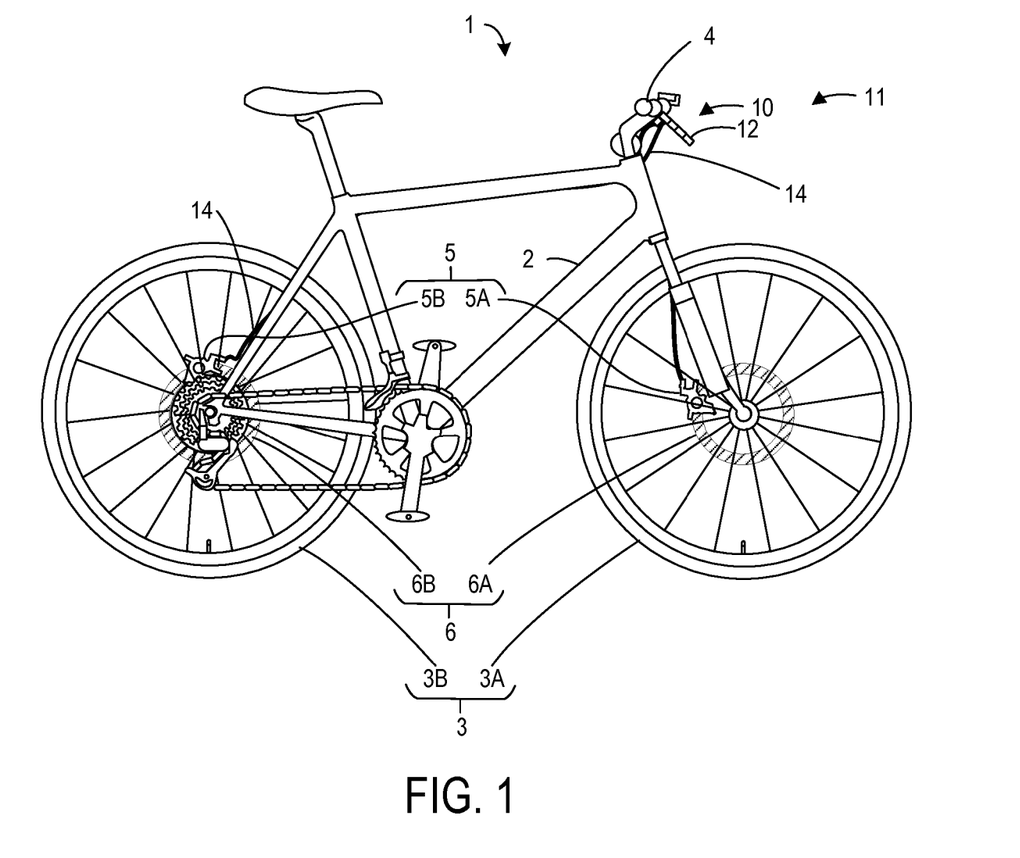
FIG. 1 shows a side view of an example bicycle with a hydraulic operating device according to a first embodiment of the present invention.

Referring initially to FIG. 1, a bicycle 1 includes a frame 2, wheels 3 rotatably coupled to the frame, and a handlebar 4 configured to turn a front wheel 3A. To apply a braking force to the wheels 3, the bicycle 1 also includes a pair of disc brake calipers 5 for gripping corresponding disc rotors 6, according to one example embodiment. In other embodiments, the bicycle 1 may include one or more rim brake mechanisms, or other type of brake mechanisms, in place of the depicted disc brake calipers 5 and disc brake rotors 6. As illustrated, front disc brake caliper SA is attached to a front fork of the frame 2 to grip a disc rotor 6A of a front wheel 3A for applying stopping force to the front wheel 3A. Rear disc brake caliper 5B is attached to a chain stay or seat stay of the frame 2 to grip a disc rotor 6B of a rear wheel 3B for applying stopping force to the rear wheel 3B.

To actuate the disc brake calipers 5, a pair of hydraulic operating devices 10 are provided, coupled to the handlebar 2. Each of the hydraulic operating devices 10 includes a respective lever, which may be referred to as a brake lever 12. The hydraulic operating devices 10, disk brake calipers 5, and disk rotors 6 are included in a hydraulic braking system 11, in one embodiment. Each of the pair of hydraulic operating devices 10 is connected to the disc brake calipers 5 by hydraulic lines 14, respectively. Actuation of the hydraulic operating devices 10 by pivoting of the brake lever 12 causes a fluid such as mineral oil to travel through the hydraulic lines 14 to each of the disc brake calipers 5. As the fluid travels into the disc brake calipers 5, it forces pistons contained therein to grip the front and rear disc rotors 6A, 6B, thereby applying stopping force to the front and rear wheels 3A, 3B, respectively. Since the hydraulic operating devices 10 have substantially same construction, only one of the hydraulic operating devices 10 is illustrated and explained in detail hereinafter for the sake of brevity.

Figure 2:
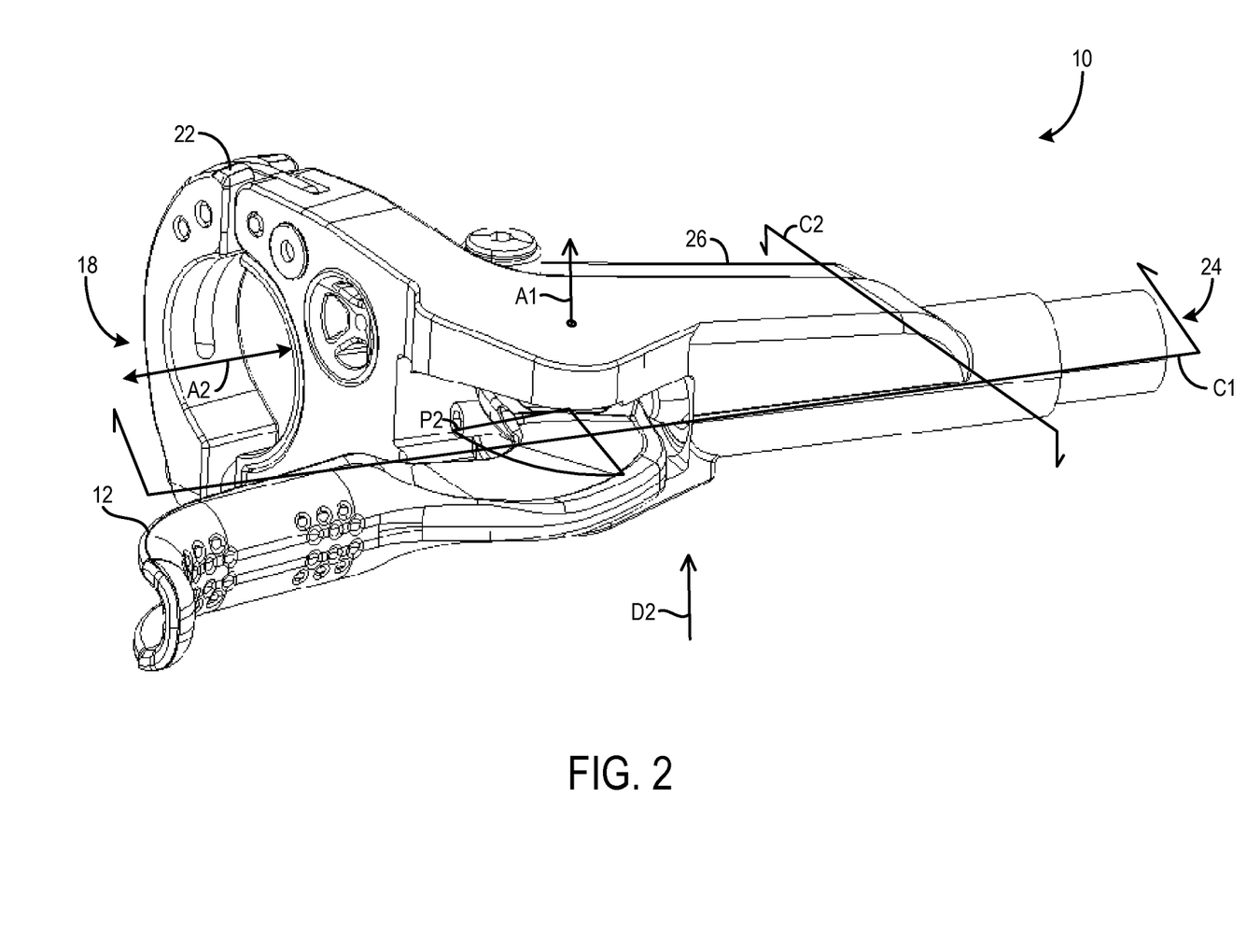
FIG. 2 is a perspective view of the hydraulic operating device of FIG. 1.

FIG. 2 shows a perspective view of one of the hydraulic operating devices 10. The hydraulic operating device 10 includes the brake lever 12 pivotally provided about a pivot axis A1. It will be appreciated that a rider of the bicycle can actuate the brake lever 12 via one or more fingers. During actuation of the brake lever 12, the brake lever pivots about the pivot axis A1. Therefore, the brake lever 12 arcs within a second plane P2 when pivoted about the pivot axis A1 during rider actuation.

The hydraulic operating device 10 also includes a handlebar mounting structure 18. The handlebar mounting structure 18 can be mounted to a handlebar, such as the handlebar 4 shown in FIG. 1. Continuing with FIG. 2, the handlebar mounting structure 18 includes a mounting axis A2. In the depicted example, the handlebar mounting structure 18 is formed as a clamp 22 and the mounting axis A2 is formed at the center of the clamp 22. The clamp 22 may be secured to the handlebar through tightening, actuation, etc., of screws, bolts, levers, etc., to decrease size of the opening in the clamp. In other embodiments, additional or alternate types of handlebar mounting structures may be used to attach the device to a handlebar such as bolts, screws, brackets, clasps, etc.

The hydraulic operating device 10 further includes an outlet 24 that may be coupled to a hydraulic line, such as one of the hydraulic lines 14, shown in FIG. 1, when used in a bicycle. Thus, the fluid in the hydraulic device 10 can flow from the outlet 24 into a hydraulic line in response to actuation of the brake lever 12.

The hydraulic operating device 10 also includes a housing 26. The housing may at least partially enclose various hydraulic components such as a hydraulic cylinder and reservoir, discussed in greater detail herein. Cutting plane C1 defines the cross-sectional view shown in FIG. 3 and cutting plane C2 defines the cross-sectional view shown in FIG. 4. FIG. 2 also shows a second direction D2 parallel to the pivot axis A1. The second direction D2 is discussed in greater detail herein with regard to FIG. 3.

Figure 3:
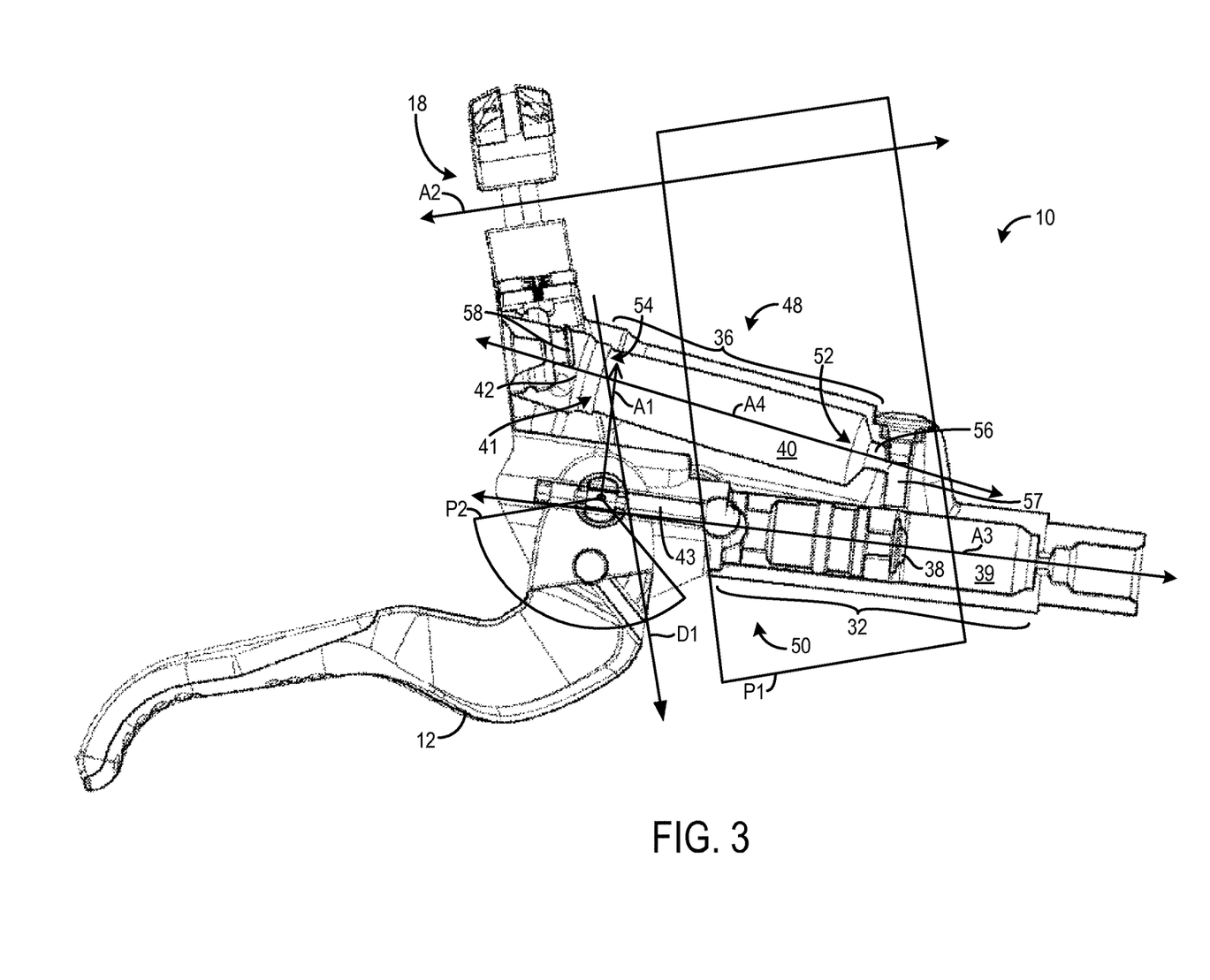
FIG. 3 is a cross-sectional view of the hydraulic operating device of FIG. 2.

FIG. 3 shows a first cross-sectional view of the hydraulic operating device 10, shown in FIG. 2. The handlebar mounting structure 18 along with the brake lever 12 and pivot axis A1 are depicted. The mounting axis A2 of the handlebar mounting structure 18 is also shown in FIG. 3.

As shown in FIG. 3, the hydraulic operating device 10 further includes a hydraulic cylinder 32 having a cylinder axis A3 and a reservoir 36 having a reservoir axis A4, and a piston 38 disposed within the hydraulic cylinder 32. A cylinder cavity 39 is provided between the hydraulic cylinder 32 and the piston 38. The fluid, such as mineral oil, is enclosed within the hydraulic cylinder 32 and the reservoir 36. The piston 38 is coupled to the brake lever 12. Actuation of the brake lever 12 moves the piston 38 in an axial direction to reduce volume of the cylinder cavity 39 and to alter the pressure of the fluid therein. A linkage 43 couples the brake lever 12 to the piston 38.

The reservoir 36 is at least partly arranged between the cylinder axis A3 and the mounting axis A2 as seen from the second direction D2, shown in FIG. 2, in the depicted embodiment. Arranging the reservoir in this way enables the compactness of the hydraulic operating device to be increased, if desired. However, the reservoir 36 may be positioned in other locations in alternate embodiments. The reservoir 36 includes an interior cavity 40 which may be cylindrical in shape in some embodiments. Therefore, the interior cavity 40 may be referred to an interior cylindrical cavity in some embodiments. However, reservoirs with alternate contours have been contemplated in other embodiments. Furthermore, the hydraulic cylinder 32 and reservoir 36 are in fluidic communication which enables excess fluid to flow into the reservoir. This operation enables a desired pressure to be maintained within the hydraulic braking system. The reservoir 36 includes an opening 41. A flexible diaphragm 42 is disposed in the opening 41. The flexible diaphragm 42 can expand when the excess fluid flows into the reservoir and contracts as the fluid leaves the reservoir. In this way, a desirable pressure range can be maintained within the hydraulic braking system 11, shown in FIG. 1. In other embodiments, the opening 41 and/or flexible diaphragm 42 may not be included in the hydraulic operating device 10.

The mounting axis A2 is also coplanar with the cylinder axis A3 in a first plane P1, in the embodiment depicted in FIG. 3. The brake lever 12 pivots on the pivot axis A1 to arc within the second plane P2 that is nonparallel to the first plane P1. Additionally, the cylinder axis A3 is non-perpendicular to the mounting axis A2. However, other mounting axis and cylinder axis orientations may be used in other embodiments. Additionally, the reservoir 36 is arranged so as to at least partially overlap the hydraulic cylinder 32 as seen from a first direction D1 perpendicular to the pivot axis A1, indicated via an arrow. Positioning the reservoir 36 and hydraulic cylinder 32 in this way enables the compactness of the device to be increased.

Furthermore, the reservoir axis A4 has a different orientation than the cylinder axis A3 as viewed from the first direction D1. It will be appreciated that the different orientation includes an orientation where the reservoir axis A4 is parallel to the cylinder axis A3. However, a multitude of axes orientations have been contemplated. For instance, the reservoir axis A4 may be oriented at an inclined angle with regard to the cylinder axis A3. It will be appreciated that gas may be easily bled from the reservoir when the reservoir and hydraulic cylinder are arranged in this way. For example, gas may form at the top of the reservoir when the reservoir is inclined, simplifying bleeding operation. Here, in this embodiment, the reservoir axis A4 is defined as a cylindrical central axis when the reservoir 36 which has a cylindrical shape. However, in other embodiments the reservoir may have a non-cylindrical shape, and in such the embodiments the reservoir axis can be considered as a central axis of a cylindrical shape which has the smallest size to accommodate such the reservoir.

The first direction D1 is perpendicular to the pivot axis A1. Additionally in the depicted example, the first direction D1 extends from a reservoir side 48 to a cylinder side 50 of the hydraulic operation device 10. The first direction D1 is perpendicular to the mounting axis A2, in the depicted embodiment. However, other orientations of the first direction D1 have been contemplated. For instance, the first direction D1 may bisect the mounting axis A2 at an angle greater or less than 90 degrees, in some embodiments.

Figure 4:
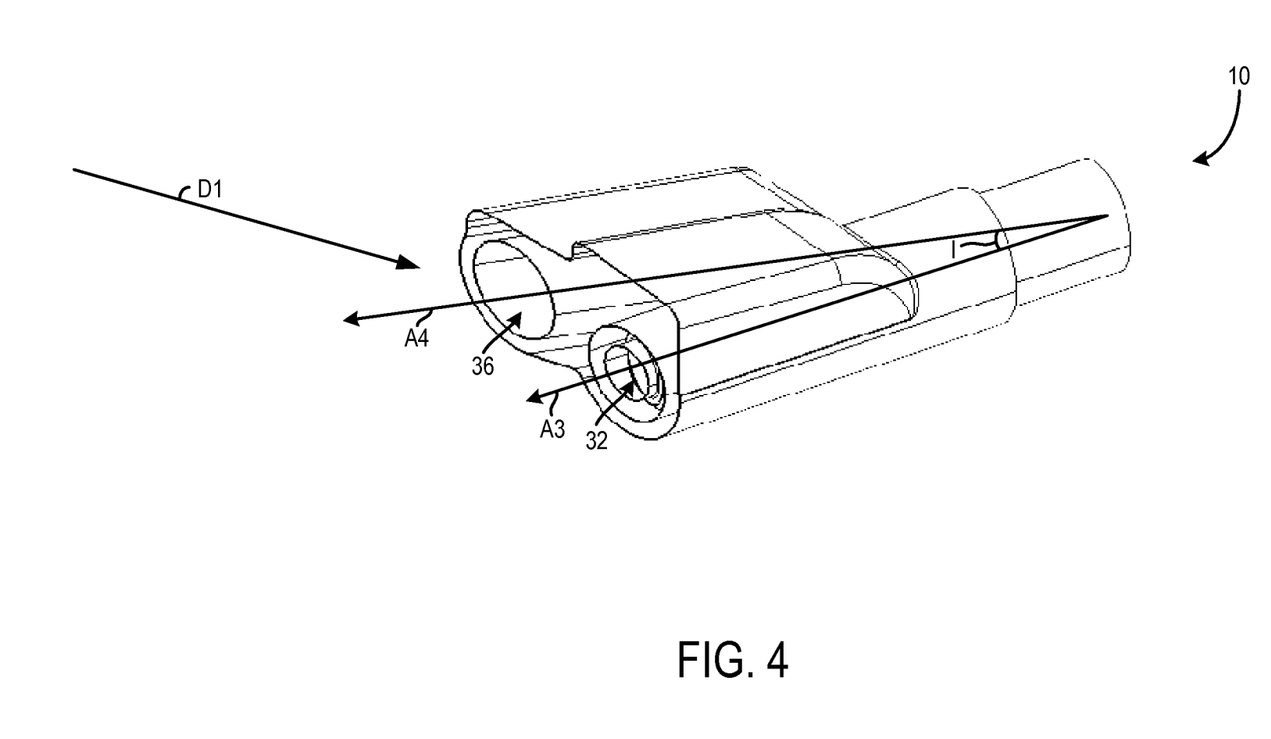
FIG. 4 is another cross-sectional view of the hydraulic operating device of FIG. 2.

Additionally as shown in FIG. 4, the reservoir axis A4 may intersect the cylinder axis A3 at a first end portion 52 of the reservoir 36 (FIG. 3). It will be appreciated that the first end portion may be referred to generally as an end portion.

As shown in FIG. 3, the reservoir 36 also includes a second end portion 54. The first end portion 52 is spaced away from the brake lever 12. Furthermore, the second end portion 54 is positioned closer to the brake lever 12 than the first end portion 52, in the depicted embodiment. Additionally, the second end portion 54 is positioned further away from the cylinder axis A3 than the first end portion 52. However, other configurations of the first and second end portions 52, 54 of the reservoir 36 have been contemplated. For instance, the first end portion 52 may be positioned closer to the brake lever 12 than the second end portion or the first and second end 52, 54 may be positioned equidistant from the brake lever 12, in other embodiments. Additionally in one embodiment, the reservoir axis A4 may pass through both the first end portion 52 and second end portion 54.

The first end portion 52 has a first port 56 that fluidly communicates with the hydraulic cylinder 32. In this way, the fluid in the hydraulic operating device 10 can flow between the hydraulic cylinder 32 and the reservoir 36. The first port 56 may include a section 57 which is radially aligned with regard to the cylinder axis A3. However, the sections of the first port 56 can have other arrangements, contours, etc., in other exemplary embodiments. For instance, the section 57 may be aligned with the cylinder axis A3, in another exemplary embodiment.

The second end portion 54 has a second port 58 configured to communicate with atmosphere for bleeding the fluid with vapor or gas from the reservoir 36. In this way, excess gas can be removed from the hydraulic braking system 11, shown in FIG. 1. Therefore, the second port 58 fluidly communicates with the surrounding atmosphere during bleeding operation. The second port 58 may include a valve mechanism to enable the aforementioned bleeding operation. The valve mechanism may be actuatable by a user. In this way, a rider can bleed the reservoir 36 when desired. However, in other embodiments the valve mechanism may be automatically actuated at desired time intervals. The second port 58 may be positioned higher than the first port 56 when the hydraulic operating device 10 is mounted to the handlebar 4 of the bicycle 1, shown in FIG. 1. In this way, gas can form near the second port 58 to enable bleeding operation.

FIG. 4 shows a second cross-sectional view of a portion the hydraulic operating device 10, shown in FIG. 2. The hydraulic cylinder 32 with the cylinder axis A3 is illustrated in FIG. 4. Additionally, the reservoir 36 with the reservoir axis A4 is also shown in FIG. 4. As illustrated, the reservoir axis A4 is inclined relative to the cylinder axis A3, as viewed from the first direction D1. Specifically, in one example the reservoir axis A4 is inclined relative to the cylinder axis A3 at an inclination angle I between 1-10 degrees. However, other inclination angle ranges have been contemplated. For instance, the inclination angle I may be between 1-5 degrees, 1-15 degrees, 1-20 degrees, etc., in other embodiments. Further in one example embodiment, cylinder axis A3 may be perpendicular to a gravitational axis.

Orienting the reservoir axis A4 with an inclined angle I relative to the cylinder axis A3 enables the reservoir 36 can be easily bled via the second port 58, shown in FIG. 3, when the bicycle 1, shown in FIG. 1, on which the device 10 is arranged is oriented in an upright riding position. As a result, a rider can quickly improve braking characteristics (e.g., braking responsiveness and braking power) in the hydraulic braking system.

Figure 5:
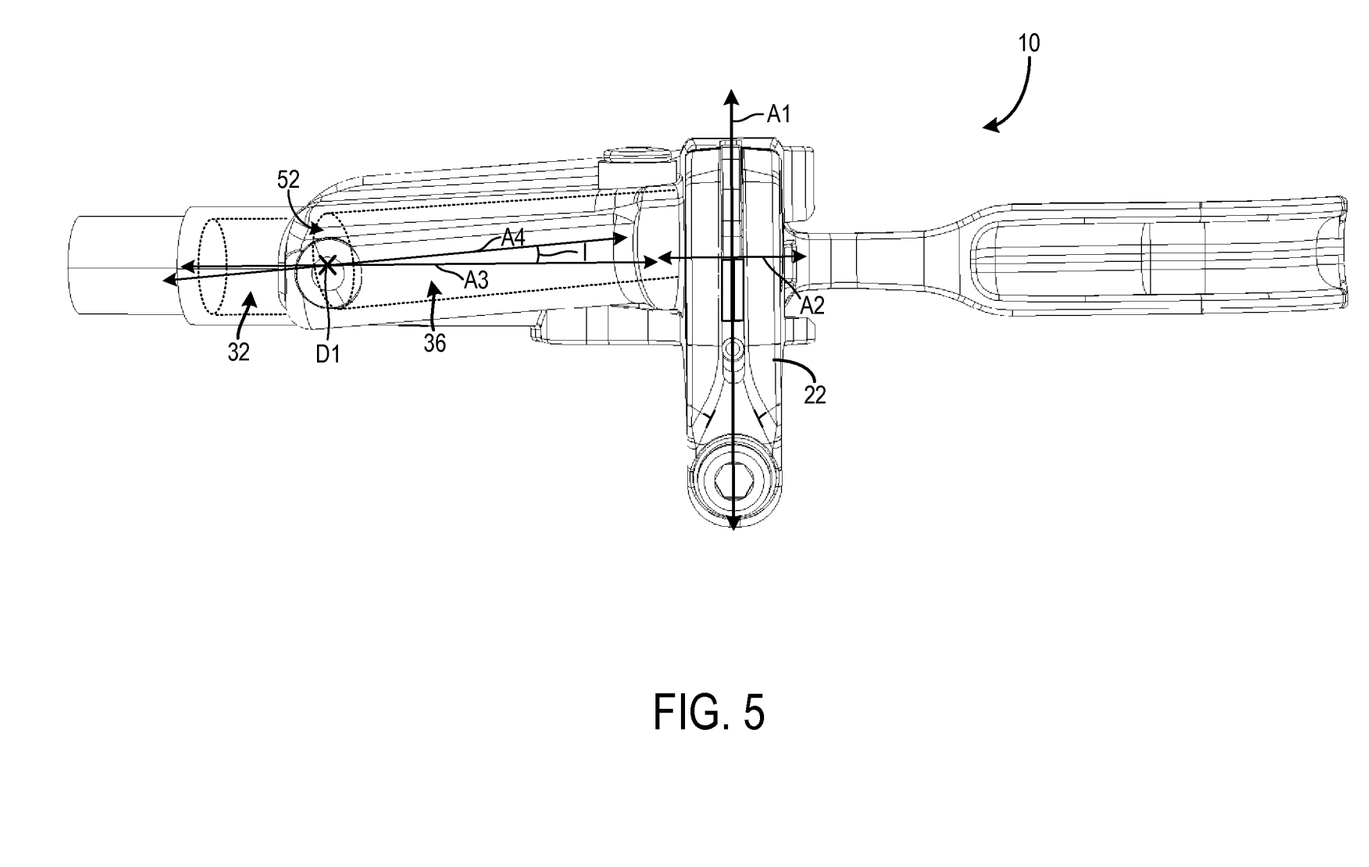
FIG. 5 shows another view of the hydraulic operating device shown in FIG. 1.

FIG. 5 shows another view of the hydraulic operating device 10. The view shown in FIG. 5 is oriented in the first direction D1. That is to say, in FIG. 5 the first direction D1 extends into the page. The hydraulic cylinder 32 with the cylinder axis A3 and the reservoir 36 with the reservoir axis A4 are each shown in FIG. 5. From this viewing angle, the reservoir 36 partially overlaps the hydraulic cylinder 32. As a result, the compactness of the device can be increased. As illustrated, the reservoir axis A4 is inclined relative to the cylinder axis A3, as viewed from the first direction D1. Thus, the reservoir axis A4 has a different orientation than the cylinder axis A3. As discussed above, a different orientation can include orientations which are parallel to one another, in other exemplary embodiments. When the reservoir 36 and hydraulic cylinder 32 are arranged in this way bleeding operation can be improved. Specifically, in one example the reservoir axis is inclined relative to the cylinder axis at an inclination angle I between 1-10 degrees. However, other inclination angle ranges have been contemplated, as previously described. Further in one example embodiment, cylinder axis A3 may be perpendicular to a gravitational axis.

Furthermore, the reservoir axis A4 intersects the cylinder axis A3 at the first end portion 52 of the reservoir 36 as viewed from the first direction D1. However, other intersection points of the aforementioned axes have been contemplated.

The mounting axis A2 of the clamp 22 is shown in FIG. 5. The mounting axis A2 is perpendicular to the first direction D1. However, in other exemplary embodiment the relative orientation of the mounting axis and the first direction may be non-perpendicular.

While hydraulic operating device 10 is depicted in the illustrated embodiments as a brake operating device including a brake lever configured to actuate braking mechanism on a bicycle, it will be appreciated that the hydraulic operating device 10 can be applied to hydraulic shifting systems or virtually any other hydraulically actuated system, and need not be limited to use with hydraulic braking systems.

The term "comprising" and its derivatives, as used herein, are intended to be open ended terms that specify the presence of the stated features, elements, components, groups, integers, and/or steps. This concept also applies to words of similar meaning, for example, the terms "have", "include" and their derivatives.

The terms of degree such as "approximately" as used herein mean a reasonable amount of deviation of the modified term such that the end result is not significantly changed (e.g., manufacturing tolerances).

While specific embodiments of the bicycle and hydraulic operating device have been described in detail, the particular arrangements disclosed are meant to be illustrative only and not limiting. The features of the various embodiments described above, as well as modifications thereof, may be variously combined without departing from the scope of this disclosure.

The invention claimed is:

1. A hydraulic operating device, comprising:
a brake lever pivotable on a pivot axis and coupled to a handlebar mounting structure having a mounting axis;
a hydraulic cylinder having a cylinder axis; and
a reservoir fixedly attached to the hydraulic cylinder and having a reservoir axis inclined relative to the cylinder axis as viewed from a first direction perpendicular to the pivot axis, the reservoir arranged so as to at least partly overlap the hydraulic cylinder at a point in a plane with the mounting axis and the cylinder axis and where the reservoir axis intersects the cylinder axis as seen from the first direction, the reservoir having a first end portion and a second end portion through which the reservoir axis travels, the first end portion fluidly communicating with the hydraulic cylinder and the second end portion being connected to the handlebar mounting structure that is closer to the second end portion than the first end portion, the second end portion further including a bleed port.

2. The hydraulic operating device of claim 1, wherein the reservoir axis is inclined relative to the cylinder axis at an inclination angle of between about 1-10 degrees.

3. The hydraulic operating device of claim 1, wherein the reservoir axis intersects the cylinder axis at the first end portion of the reservoir as viewed from the first direction.

4. The hydraulic operating device of claim 1, wherein the first end portion of the reservoir is positioned away from the brake lever and the second end portion is positioned closer to the brake lever than the first end portion; and wherein the second end portion is positioned farther away from the cylinder axis than the first end portion.

5. The hydraulic operating device of claim 4, wherein the first end portion has a first port that fluidly communicates with the hydraulic cylinder.

6. The hydraulic operating device of claim 5, wherein the bleed port included on the second end portion for bleeding communicates with atmosphere.

7. The hydraulic operating device of claim 6, wherein the bleed port is positioned higher than the first port when the device is mounted to a handlebar of a bicycle.

8. The hydraulic operating device of claim 1, wherein the cylinder axis is non-perpendicular to the mounting axis.

9. The hydraulic operating device of claim 8, wherein the handlebar mounting structure is a clamp and the mounting axis is formed at a center of the clamp.

10. The hydraulic operating device of claim 8, wherein the first direction is also perpendicular to the mounting axis.

11. The hydraulic operating device of claim 8, wherein the reservoir is at least partly arranged between the cylinder axis and the mounting axis as seen from a second direction that is parallel to the pivot axis.

12. The hydraulic operating device of claim 8, wherein the mounting axis is coplanar with the cylinder axis in a first plane.

13. The hydraulic operating device of claim 12, wherein the brake lever pivots on the pivot axis to arc within a second plane that is nonparallel to the first plane.

14. The hydraulic operating device of claim 8,
wherein the first end portion of the reservoir is positioned away from the brake lever and the second end portion is positioned closer to the brake lever than the first end portion, and wherein the second end portion is positioned farther away from the cylinder axis than the first end portion; and
wherein the handlebar mounting structure is closer to the second end portion than the first end portion.

15. The hydraulic operating device of claim 1, wherein the reservoir has an interior cylindrical cavity.

16. The hydraulic operating device of claim 1, further comprising:
an opening in the reservoir; and
a flexible diaphragm disposed in the opening of the reservoir.

17. The hydraulic operating device of claim 16,
wherein the first end portion of the reservoir is positioned away from the brake lever and the second end portion is positioned closer to the brake lever than the first end portion, and wherein the second end portion is positioned farther away from the cylinder axis than the first end portion; and wherein the opening is arranged at the second end portion of the reservoir.

* * * * *